Figure 1:
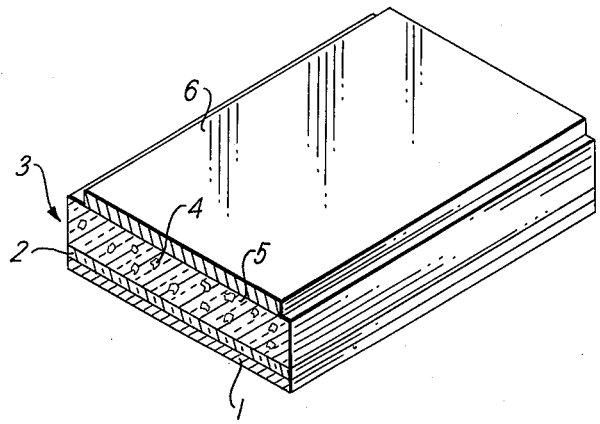

Sept. 10, 1963 R. M. RULON 3,103,607
ELECTROLUMINESCENT LAMP WITH CERAMIC DIELECTRIC
Original Filed July 2, 1953

INVENTOR
RICHARD M. RULON
BY Lawrence Burns,
ATTORNEY 3,103,607
ELECTROLUMINESCENT LAMP WITH
CERAMIC DIELECTRIC
Richard M. Rulon, Salem, Mass., assignor to Sylvania
Electric Products Inc., a corporation of Delaware
Continuation of abandoned application Ser. No. 365,617,
July 2, 1953. This application May 1, 1959, Ser. No.
810,509
18 Claims. (Cl. 313—108)

This invention relates to electroluminescent lamps, that is to lamps in which light is produced by exciting an electroluminescent phosphor by an electric field.

The phosphor in such lamps has generally been embedded in a liquid or plastic dielectric material such as nitrocellulose or the like. In the present invention the phosphor is embedded in a ceramic such as an enamel or a glaze, thus providing a device which is not susceptible to the intrusion of moisture. Furthermore, the ceramic itself acts as a base to which a transparent conductive coating can be directly applied.

It has been discovered that the high temperature necessary to fuse the ceramic material around the phosphor particles does not destroy the electroluminescent ability of the phosphor, although application of the same temperature to a thin, exposed phosphor layer will destroy its luminescence. The phosphor will withstand a much higher temperature in being fused into the ceramic than it will on exposure to air. However, too high a fusion temperature may destroy the phosphor even in the ceramic dielectric and the material used must accordingly be fusible below the temperature at which the phosphor would be destroyed in the fusion of the dielectric.

It is desirable that the ceramic should be free from any appreciable quantities of easily-reducible metallic compounds. A deposit of such reduced metals throughout the dielectric may tend to decrease the luminosity of the device. The ceramic should also be free from compounds which react adversely with the phosphor at the temperatures used. When sulfide phosphors are used, lead should not be present in appreciable amounts in a form in which it would react with the phosphor to produce black lead sulfide.

In accordance with one aspect of the present invention, it is contemplated that the phosphor-ceramic be fused directly onto a suitable metal plate, serving as one electrode of the device, in which case the metal plate should have substantially the same coefficient of expansion as that of the ceramic.

In another embodiment, the phosphor-ceramic is fused onto a transparent conductive coating on a transparent ceramic plate, and another transparent conductive coating applied to the phosphor-ceramic surface, to provide a lamp giving light from both sides. If light is only desired from one side, a reflective metal coating can be used in place of one of the transparent conductive coatings.

A lamp emitting light from both surfaces, however, will give about 60% greater total light output than a lamp in which one coating is reflective, but the lamp with the metal reflecting coating on one surface will give about 20% more light in the direction of reflection.

Figure 2:
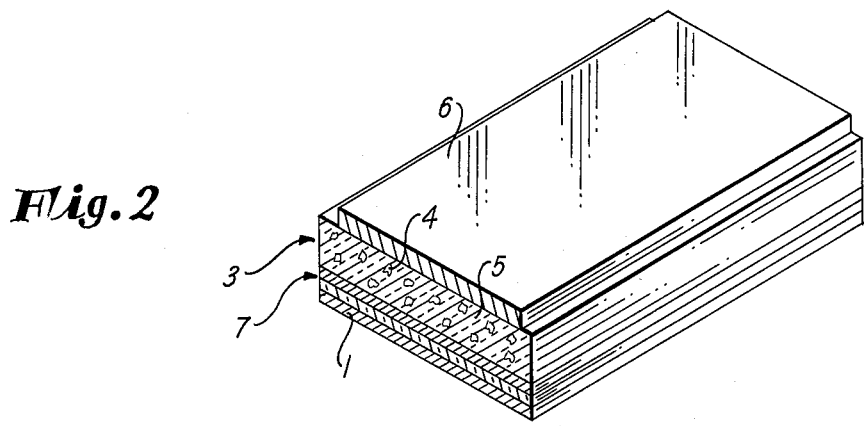
Figure 3:
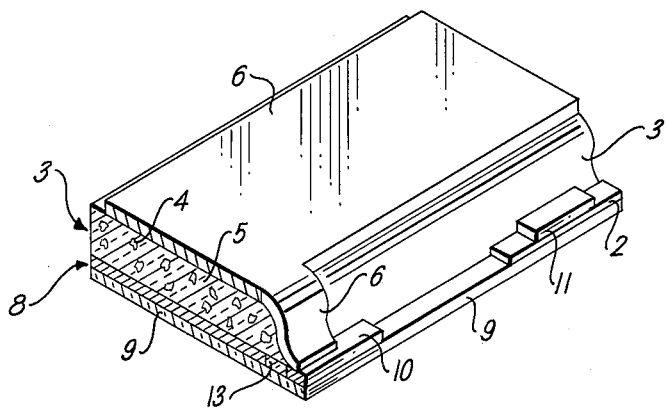

Illustrative embodiments of the invention are shown in the accompanying drawing, in which FIGURE 1 is a perspective view, partly in section, of one embodiment in which one electrode is a metal plate; FIG. 2 is an embodiment in which a metal plate is used as a base, but in which both electrodes are transparent conducting layers; and FIG. 3 is an embodiment in which both electrodes are conductive coatings.

FIGURE 1 shows a cut-away perspective view, partly in section, of an electroluminescent lamp in which the metal plate 1 carries the fused layer 2 of ceramic material, as a ground coat for carrying the layer 3, which is composed of a mixture of ceramic material 5 and fine particles 4 of phosphor. The ground coat or layer 2 can be omitted where the character of the ceramic 5 and metal plate 1 are such that the layer 3 can be applied directly to the metal. A transparent conductive coating 6 is carried by the layer 3, on the side of the latter opposite to that nearest to the metal plate 1. The metal plate 1 and the transparent conductive coating 6 are the electrodes, and when an alternating voltage is applied between them, the phosphor luminesces.

The metal plate 1 may be of various materials, for example, copper, steel, nickel coated steel, or copper coated steel. The metal used should be one capable of sealing to the ceramic used, and is preferably one of good reflectivity.

The conductive glass coating 6 may be of any suitable material, for example of tin, silicon or titanium chlorides applied as shown in copending application Serial No. 180,785, filed August 22, 1950, by Eric Mager, now Patent 2,848,637, or sprayed in appropriate solutions directly onto the hot surface of the ceramic layer as the latter emerges from an oven.

The phosphor 4 is in the form of a powder of fine particles, and can be shown in the copending application, Serial No. 230,711, filed June 8, 1951, by Butler and Homer, now Patent 2,772,242. Zinc silicate, manganese-activated, and preferably containing a small amount of lead, and calcium silicate, activated with manganese and lead, have also been used.

The ceramic material 5 is selected for its capability of fusing or sintering at a temperature below that which would destroy the phosphor during the fusion process. It is preferably free of any appreciable quantities of easily-reducible metallic compounds which would give an undesirable metallic deposit. The ceramic should also be one capable of being bonded securely to the metal used. Among the compounds which have been found suitable are the following:

(1) Commercial frit comprising silica, boric anhydride, an alkali metal oxide, an alkaline earth oxide, and alumina.

(2) Glass comprising 30% $Na_2O_3$, 22% $P_2O_5$, 31% $Al_2O_3$ and 17% $B_2O_3$ the percentages taken by moles.

(3) Glass comprising 16% $Li_2O$, 5% CaO, 30% $SiO_2$, 24% $B_2O_3$ and 25% ZnO, the percentages being taken by moles.

(4) Glass comprising 5% $Na_2O$, 10% $Li_2O$, 10% CaO, 30% $SiO_2$, 20% $B_2O_3$ and 25% ZnO, the percentages being taken by moles.

(5) Glass comprising about 3.9% CaO, 4.8% BaO, 27.2% ZnO, 21.8% $SiO_2$, 26.8% $B_2O_3$, 8.8% $Na_2O$, 0.7% PbO, 5.8% $R_2O_3$, the percentages being taken by weight. In the latter compound R has been used as a generic term to include one or more metals whose oxides can exist in this empirical form.

Lead should not be present in the ceramic in any substantial amount in a form which can react with the phosphors to form a black, light-absorbing layer such as lead sulfide. Easily reduced materials which will increase the conductivity should also be avoided in the ceramic for best results.

The ceramic material of layer 2 is used as a ground coat and can be one of the foregoing compositions, or a different composition. The use of a ground coat is customary in enamelling processes.

The metal surface 1 can be cleaned by methods well-known in the art, and the ground coat applied, if one is to be used. A mixture of powdered ceramic material and phosphor, with an organic or ceramic binder if desired, for example, ball clay, bentonite or gum acacia, is applied to the metal by spraying, flowing, dipping or other suitable method, and the combination placed in an oven for a time sufficient to fuse or sinter the powdered ceramic material to form a smooth, adherent, non-porous ceramic dielectric layer with the phosphor particles embedded therein. The metal piece 1 with the ceramic layer or layers over it is then removed from the oven and the transparent conductive coating 6 applied over the ceramic 3. The conductive coating 6 may be applied to the ceramic layer 3 immediately on taking the latter from the oven, as for example by spraying a suitable tin compound onto the hot ceramic, or the piece may be cooled and a conductive coating applied afterward.

A neutral or reducing atmosphere can be used during the fusing or sintering, although it is not usually necessary.

As a specific example of the invention, a piece 1 of clean copper-plated steel was rinsed thoroughly in water and dried. A layer of the powdered plain glass of composition No. 3 (without any added phosphor) as previously described, was sifted onto the metal piece 1 and placed in an oven at 700° C. for six minutes. After it had cooled, a layer of a mixture of 90% by weight of a powdered glass of composition No. 4 and 10% by weight of a yellow-electroluminescing zinc sulfide phosphor, activated with small amounts of copper, manganese and lead, as in copending application Serial No. 230,711, filed June 8, 1951, by Keith H. Butler, was sifted onto the ceramic layer 2. The metal piece 1 with fused ceramic layer 2, and over that the powdered layer 3 of glass and phosphor which had been sifted onto said ceramic layer 2 was placed in an oven at 700° C. for six minutes and then allowed to cool.

A conducting coating 6 was applied and a voltage of 1500 volts applied between said coating 6 and the metal piece 1. The light emitted was measured as 0.02 foot-lambert on a Taylor Luckiesh light meter.

The light output will vary with the phosphor used, the voltage applied, the dielectric constant of the ceramic, the thickness of the ceramic layer and with other factors. As a further example of the light output from devices as described herein, an emission of 0.5 foot-lambert has been obtained with an 18-mil thickness between the metal piece 1 and the transparent conductive coating 6. The applied voltage was 1500 volts, 60 cycles per second. Reducing the thickness to only a few mils, for example, 2 or 3 mils, permits operation at lower voltage with good brightness.

When the phosphor used is zinc sulfide containing a manganese activator, the latter may go into solid solution in the ceramic. In such cases, I have added to the ceramic concentration of a manganese salt, such as the carbonate, about equal to the effective molal concentration of manganese in the phosphor. Unless this is done, the luminescence of a phosphor activated jointly with copper, lead and manganese, and giving a yellowish emission color, may give a greenish omission when in the glass, apparently because of loss of manganese. The copper activator does not appear to be lost as readily.

A thin vaporized metal such as gold can be used as the transparent conductive coating 6, but if such a coating is made thin enough to avoid light transmission losses, it will generally be of too low conductivity to give the most desirable results.

The transparent conductive coating 6 may be applied to a glass plate, if desired, and the ceramic-and-phosphor mixture of layer 3 fused over it, with the metal conductor 1 then applied as suitable metal coating vaporized or painted over the ceramic and phosphor layer 3, either with or without the interposition of the plain ceramic layer 2.

In FIGURE 2, an additional conductive coating 7, which may be transparent if desired, is used between the ground coating 2 and the phosphor dielectric layer 3. This may be applied to the ground coat, after the latter is fired in the same manner as it is applied to the phosphor-ceramic layer 3 in the preceding embodiment.

In FIGURE 3, the phosphor-ceramic layer 3 is applied over a transparent conductive coating 8 on the glass plate 9. The conductive coating 6 on the phosphor-ceramic layer 3 can be of a metal or of a transparent conductive, such as that produced with the stannic chloride treatment previously described. In the latter case, the lamp will emit light in both directions, that is through each of the transparent conductive coatings 6, 8.

In one embodiment, such a lamp was made from a piece of glass 9 having a conductive coating 8 and being approximately ⅛ to ¼ inch larger in dimension than the area desired in the finished lamp. The conductive coating 8 was removed at the surface of the glass to a distance of 1/16 to ⅛ inch in from the edge except for a distance of about 1 to 1½ inches along one edge.

The glass piece 8 was then cleaned thoroughly with a detergent and sponge to remove all surface contamination.

A suspension was prepared suitable for spraying by ball-milling a mixture of 100 parts of ceramic frit (powdered to 200 mesh) and 40 parts of electroluminescent phosphor in isopropyl alcohol with a small amount of water present, about 10% by volume. About 10 to 30 grams/sq. ft. (dry weight) of this ceramic-phosphor mixture was sprayed onto the conductive surface 8 of the glass. After spraying, the coating was air-dried for 10 minutes at room temperature and for 10 to 15 minutes at 150° C.

The ceramic-phosphor layer 3 was then removed from the surface of the glass 9 in the region of the silver contacts 10, 11, along the edge, one on that section of the glass where the conductive film 8 extends to the edge of the glass and the second at another area at least ⅛ to ¼ inch from the first. This second area extended approximately one-half as far in from the edge of the glass as the conductive film had been removed, and left the space 13, filled with ceramic-phosphor 3, between the contact 10 and the conductive surface 8. The two contact areas each extended for about an inch along the edge of the glass although smaller or larger areas can be used depending upon the lamp size desired.

A small amount of dispersing agent, say 10%, can be added to the phosphor-ceramic suspension, if desired, before spraying it onto the glass plate 9.

The "firing" type of silver paint, as shown in copending application Serial No. 230,596, now abandoned, filed June 8, 1951, by E. F. Lowry, E. L. Mager and K. H. Butler, was then applied to form the contacts 10, 11 and dried at 150° C. for 10 minutes.

The glass piece 9 was then placed on a flat ceramic support with the ceramic-phosphor layer 3 uppermost, and heated in an oven at 780° C. for 2½ to 3 minutes. At the end of that time, the ceramic material had fused to the glass surface and formed a continuous layer with the phosphor imbedded therein. The ceramic carrying support and the coated glass piece 9 were then removed to a spray hood and the surface of the fused ceramic-phosphor layer 3 was sprayed with a solution of stannic chloride in mixed solvents, in the proportion of about 1 gram of $SnCl_4 \cdot 5H_2O$, 0.5 cc. of formaldehyde solution (37% HCHO) and 0.8 cc. of ethyl alcohol (acetone-denatured). The spraying was done while the surface of the fused layer was still hot, i.e., within 10 to 15 seconds after its removal from the hot zone of the furnace.

The device was then cooled to room temperature and the transparent conductive film 6 removed from the area where it came in contact with the silver contact 11 previously applied to the first conductive coating 8. The conductive coating 6 extends into contact with contact 10, however.

Upon application of an alternating electrical potential between the two silvered portions 12, 13 and hence between the two transparent conductive films 6, 8, the ceramic phosphor layer 3 was made to light with substantially equal luminosities through each of the two transparent surfaces 6, 8.

The completed lamp had a brightness of more than 0.2 footlambert at 120 volts 60 cycles and 2.0 footlamberts at 600 volts 60 cycles from each of the two surfaces.

An advantage of the embodiment just described is that it has two extensive luminous surfaces with a total lamp thickness of substantially less than ⅛ inch. This is a very useful type of structure for advertising display purposes and the like.

A clear lacquer can be applied to the "back" or second conductive surface of the lamp to avoid the possibility of electrical shock, although this would not be necessary for all uses of the lamp.

Additional fused ceramic layers can be applied between or over any of the described plates or layers 1 to 9, where desired. If the layer 2 of FIG. 2 is made with some phosphor embedded in it, a voltage may be applied not only between the conductive layers 6 and 7, but also between the conductive layer 6 and the metal plate 1, thereby increasing the illumination. A similar effect may be obtained in the embodiments of the other figures, if additional ceramic-phosphor layers and conductive coatings are added over the others.

The thicknesses of the various layers, coatings, and contacts have been exaggerated in the drawings for clarity, and the relative thicknesses are not necessarily of the order shown, as is clear from the foregoing description.

This application is in part a continuation of pending application Serial No. 282,003, now abandoned, filed April 12, 1952, by the applicant, and a continuation of application Serial No. 365,617, now abandoned, filed July 2, 1953, by the applicant.

What I claim is:

1. An electroluminescent lamp comprising a light-transmitting conductive surface, a layer of a mixture of ceramic and an electroluminescent phosphor fused to said conductive surface, and a conductive coating over said layer.

2. An electroluminescent lamp comprising a light-transmitting plate having a light-transmitting conductive surface, a layer of a mixture of ceramic and an electroluminescent phosphor fused to said conductive surface, and a light-transmitting conductive coating over said layer.

3. An electroluminescent lamp comprising a light-transmitting plate having a light-transmitting conductive surface, a layer of a mixture of phosphor and a zinc-oxide containing ceramic fused to said conductive surface, and a light transmitting conductive coating over said layer.

4. A combination of claim 3, in which the light-transmitting coatings comprise a compound selected from the group consisting of tin, silicon, titanium and indium chlorides.

5. The method of making an electroluminescent lamp which comprises the steps of coating a conductive material with a powdered mixture of phosphor and ceramic, heating said mixture to fuse it to the conductive material, and then while the mixture is still hot from said heating, spraying onto it a coating of a light-transmitting conductive substance.

6. The method of making an electroluminescent lamp which comprises the steps of coating a conductive material with a powdered ceramic, heating the ceramic to fuse it to said conductive material, coating the fused ceramic with a powdered mixture of phosphor and ceramic, heating said mixture to fuse it to said ceramic, and then while the mixture is still hot from heating spraying onto it a coating of a light-transmitting conductive substance.

7. An electroluminescent lamp having two electrodes, and fused therebetween a layer of an electroluminescent phosphor embedded in a light-transmitted ceramic material substantially free of easily-reducible compounds which leave a harmful residue.

8. An electroluminescent lamp comprising a plate with a conductive surface, a light-transmitting ceramic material fused to said plate, an electroluminescent phosphor embedded in said ceramic, and a conducting surface over at least part of said ceramic.

9. An electroluminescent lamp comprising a plate having a conductive surface, a layer of ceramic material fused to said plate, a layer of a mixture of light-transmitting ceramic and an electroluminescent phosphor fused to said first mentioned ceramic layer, and a transparent conducting surface on said fused layer of ceramic and phosphor.

10. An electroluminescent lamp comprising a metal plate, a layer of a mixture of light-transmitting ceramic and electroluminescent phosphor fused to said plate, and a transparent conducting surface in close electrical proximity to said layer.

11. An electroluminescent lamp comprising a metal plate, a ceramic layer fused to said plate, a layer of a light-transmitting ceramic and electroluminescent phosphor fused to said first mentioned layer and a transparent conductive surface in close electrical proximity to said second-mentioned layer.

12. An electroluminescent lamp comprising: a metal plate; a layer of light-transmitting ceramic material fused thereto and comprising lithium oxide, calcium oxide, silica, boric anhydride and zinc oxide; a layer fused to said first-mentioned layer and comprising a powdered electroluminescent phosphor and an enamel of sodium oxide, lithium oxide, calcium oxide, silica, boric anhydride and zinc oxide; and a transparent conductive coating in close electrical proximity to said first-mentioned layer.

13. An electroluminescent lamp comprising at least one pair of electrodes, at least one of said electrodes being light-transmissive, and a multiplicity of layers of ceramic therebetween, at least one of said layers having electroluminescent phosphor particles embedded therein and being fused to one of said electrodes.

14. An electroluminescent lamp comprising a metal plate, a ceramic ground coat on said metal plate, a conductive coating on said ground coat, a layer of electroluminescent phosphor and ceramic over said conductive coating and fused thereto, and a light-transmitting conductive coating over said layer.

15. An electroluminescent lamp comprising a thin sheet of ceramic and electroluminescent phosphor, with an electrode on each side thereof, at least one of said electrodes being transmissive of light and fused to said sheet of ceramic and electroluminescent phosphor.

16. An electroluminescent lamp consisting essentially of an electrode, a layer of dielectric material and phosphor over said electrode, a transparent conductive layer over said first-mentioned layer, a second layer of dielectric material and phosphor over said transparent-conductive layer, and another transparent conductive layer over said second layer of dielectric material and phosphor.

17. An electroluminescent lamp comprising an electrode, a layer of ceramic dielectric material and phosphor fused over said electrode, a transparent conductive layer over said first-mentioned layer, a second layer of ceramic dielectric material and phosphor fused over said transparent conductive layer, and another transparent conductive layer over said layer of dielectric material and phosphor.

18. An electroluminescent lamp comprising a light-transmitting plate having a light-transmitting conductive surface, a layer of a mixture of ceramic and an electroluminescent phosphor fused to said conductive surface, and a conductive coating over said layer.

References Cited in the file of this patent

UNITED STATES PATENTS

| | | |
|---|---|---|
| 2,566,349 | Mager | Sept. 4, 1951 |
| 2,730,644 | Michlin | Jan. 10, 1956 |